(12) United States Patent
Jauss et al.

(10) Patent No.: US 11,482,741 B2
(45) Date of Patent: Oct. 25, 2022

(54) ENERGY-STORAGE ARRANGEMENT FOR AN ELECTRIC OR HYBRID VEHICLE

(71) Applicant: Mahle International GmbH, Stuttgart (DE)

(72) Inventors: Stefan Jauss, Donzdorf (DE); Daniel Rothmaier, Maulbronn (DE)

(73) Assignee: Mahle International GmbH

(*) Notice: Subject to any disclaimer, the term of this patent is extended or adjusted under 35 U.S.C. 154(b) by 378 days.

(21) Appl. No.: 16/539,811

(22) Filed: Aug. 13, 2019

(65) Prior Publication Data

US 2020/0058975 A1 Feb. 20, 2020

(30) Foreign Application Priority Data

Aug. 14, 2018 (DE) .......................... 102018213669.6

(51) Int. Cl.
*H01M 10/00* (2006.01)
*H01M 10/6568* (2014.01)
(Continued)

(52) U.S. Cl.
CPC ........ *H01M 10/6568* (2015.04); *B01D 15/08* (2013.01); *B01D 36/006* (2013.01); *H01M 10/613* (2015.04); *H01M 10/625* (2015.04); *H01M 10/6552* (2015.04); *B60K 6/28* (2013.01); *B60L 50/64* (2019.02); *B60L 58/26* (2019.02); *B60Y 2200/91* (2013.01); *B60Y 2200/92* (2013.01); *B60Y 2306/05* (2013.01);
(Continued)

(58) Field of Classification Search
CPC ........... H01M 10/613; H01M 10/6568; H01M 10/6552; H01M 2220/20; H01M 10/6556
See application file for complete search history.

(56) References Cited

U.S. PATENT DOCUMENTS

2010/0212338 A1* 8/2010 Hermann ............ H01M 10/663
62/118
2011/0027630 A1* 2/2011 Tsutsumi .......... H01M 10/0459
429/53
(Continued)

FOREIGN PATENT DOCUMENTS

CN 102589212 A 7/2012
DE 102011015337 A1 10/2012

OTHER PUBLICATIONS

English abstract for DE-102011015337-A1.
English abstract for CN-102589212-A.

*Primary Examiner* — Cynthia H Kelly
*Assistant Examiner* — Monique M Wills
(74) *Attorney, Agent, or Firm* — Fishman Stewart PLLC

(57) ABSTRACT

An energy-storage arrangement for, e.g., an electric or hybrid vehicle includes an energy-storage device including energy-storage cells arranged in a housing. The housing includes an inlet and an outlet for a temperature-control fluid, that may provide for direct temperature control of the energy-storage cells in the housing. The energy-storage arrangement further includes a temperature-control-fluid circuit, in which the housing, a pump for conveying the temperature-control fluid, and a heat-transfer device are arranged. A water-separator for separating or discharging water from the temperature-control fluid may be provided in the temperature-control-fluid circuit.

20 Claims, 1 Drawing Sheet

(51) Int. Cl.
*H01M 10/613* (2014.01)
*H01M 10/625* (2014.01)
*H01M 10/6552* (2014.01)
*B01D 36/00* (2006.01)
*B01D 15/08* (2006.01)
*B60L 58/26* (2019.01)
*B60K 6/28* (2007.10)
*B60L 50/64* (2019.01)

(52) U.S. Cl.
CPC .... *B60Y 2400/112* (2013.01); *H01M 2220/20* (2013.01)

(56) References Cited

U.S. PATENT DOCUMENTS

2011/0115223 A1\* 5/2011 Stahlkopf ............... F04B 49/22
290/7
2013/0260195 A1 10/2013 Long \* cited by examiner

ENERGY-STORAGE ARRANGEMENT FOR AN ELECTRIC OR HYBRID VEHICLE

CROSS-REFERENCE TO RELATED APPLICATION

This application claims priority to German Application No. DE 10 2018 213 669.6 filed on Aug. 14, 2018, the contents of which are hereby incorporated by reference in its entirety.

TECHNICAL FIELD

The present invention relates to an energy-storage arrangement for an electric or hybrid vehicle, with an energy-storage device with energy-storage cells arranged in a housing. The invention relates, in addition, to an electric or hybrid vehicle with such an energy-storage arrangement.

BACKGROUND

Vehicles that are propelled, in particular, by purely electromotive means ordinarily possess by way of energy-storage device a rechargeable lithium-ion battery which displays considerable evolution of heat in the course of rapid charging and discharging processes, and in which this heat has to be dissipated, in order to be reliably able to avoid an overheating of the energy-storage device. For the purpose of cooling the energy-storage devices, so-called indirect cooling or direct cooling is optionally employed. In the case of indirect cooling, a transfer of heat ordinarily occurs via a cooling plate bearing against a respective energy-storage cell in planar manner. In the case of direct cooling, the energy-storage cells are flowed around directly by temperature-control fluid—for instance, cooling oil. Direct cooling displays a distinctly higher efficiency than indirect cooling, and is therefore preferred. Since in the case of direct cooling the temperature-control fluid, or cooling oil, is in direct contact with the energy-storage cells, said fluid has to be electrically non-conducting, in order to be able to reliably rule out a short circuit. However, this is a very demanding requirement.

From US 2013/0260195 A1 a generic energy-storage device for an electric or hybrid vehicle is known which exhibits a housing in which energy-storage cells are arranged. The housing itself possesses an inlet and also an outlet for temperature-control fluid for direct temperature control—in particular for direct cooling—of the energy-storage cells.

The present invention is concerned with the problem of specifying an improved or at least an alternative embodiment for an energy-storage arrangement of the generic type, which, in particular, enables a reliable operation of said arrangement.

In accordance with the invention, this problem is solved by the subject-matter of the independent claim(s). Advantageous embodiments are the subject-matter of the dependent claims.

SUMMARY

The present invention is based on the general idea of undertaking, in an energy-storage arrangement known as such with an energy-storage device, a direct cooling of energy-storage cells arranged in a housing of the energy-storage device, and of using for the temperature-control fluid provided for this purpose—for instance, cooling oil—a water-separator, by means of which water contents can be separated or discharged from the temperature-control fluid—for instance, from the cooling oil—as a result of which a danger of a short circuit can be distinctly reduced. The energy-storage arrangement according to the invention for an electric or hybrid vehicle exhibits an energy-storage device with energy-storage cells arranged in a housing. This housing possesses an inlet and also an outlet for temperature-control fluid for direct temperature control—in particular for direct cooling—of the energy-storage cells. Now, in accordance with the invention the energy-storage arrangement exhibits a temperature-control-fluid circuit in which the housing—that is to say, the energy-storage device—a pump for conveying the temperature-control fluid and also a heat-transfer means—in particular a radiator—are arranged. In the temperature-control-fluid circuit in addition, a water-separator for separating or discharging water from the temperature-control fluid is arranged. Via the water-separator, water contents that are present in the temperature-control fluid can consequently be discharged or separated, as a result of which a transmission of current between the individual energy-storage cells via the water particles in the temperature-control fluid can be avoided, and thereby the service life of the entire energy-storage device can also be increased. By virtue of at least the reduction of the water content that is present in the temperature-control fluid, a dielectric effect of the temperature-control fluid can be improved, and damage to the energy-storage device—for instance, as a result of a short circuit—can thereby be reliably avoided.

In an advantageous further development of the solution according to the invention, a filter device is arranged in the temperature-control-fluid circuit. A filter device of such a type may, for instance, exhibit a particle-filter. A filter device of such a type can consequently help to separate or filter out particles of solid matter entrained in the temperature-control fluid, which may result in damage to the pump or to the energy-storage cells, as a result of which the service life of the energy-storage arrangement can likewise be boosted.

In an advantageous further development of the solution according to the invention, the water-separator is a constituent part of the filter device. The water-separator may consequently be a conventional constituent part of an oil-filter, to the extent that the temperature-control fluid takes the form of cooling oil. Via the water-separator, water that is present in the temperature-control fluid is separated or discharged and, for instance, collected in a separate water-collecting chamber.

Additionally or alternatively, the invention may also provide that the water-separator takes the form of a dryer, in particular a cartridge-type dryer. Via a dryer of such a type, the temperature-control fluid—that is to say, in the special case, the cooling oil—is dried, and the water content in the temperature-control fluid is at least reduced thereby. The dryer in this case may have been arranged in a partial-flow circuit of the temperature-control-fluid circuit, in order to be able to keep a loss of pressure to a degree that is tolerable for an orderly operation of the energy-storage arrangement.

The present invention is based, furthermore, on the general idea of equipping an electric or hybrid vehicle with such an energy-storage arrangement, and thereby of boosting the service life of the energy-storage arrangement and of the electric or hybrid vehicle, since, in particular, the water constituents increasing the electrical conductivity of the temperature-control fluid can be reduced.

Further important features and advantages of the invention arise from the dependent claims, from the drawings and from the associated description of the Figures with reference to the drawings.

It will be understood that the aforementioned features and the features still to be elucidated below can be used not only in the respectively specified combination but also in other combinations or on their own, without departing from the scope of the present invention.

Preferred examples of embodiments of the invention are represented in the drawings and will be elucidated in greater detail in the following description, wherein identical reference symbols relate to identical or similar or functionally identical components.

BRIEF DESCRIPTION OF THE DRAWINGS

Shown, in each instance schematically, are.

DETAILED DESCRIPTION

Figure 1:
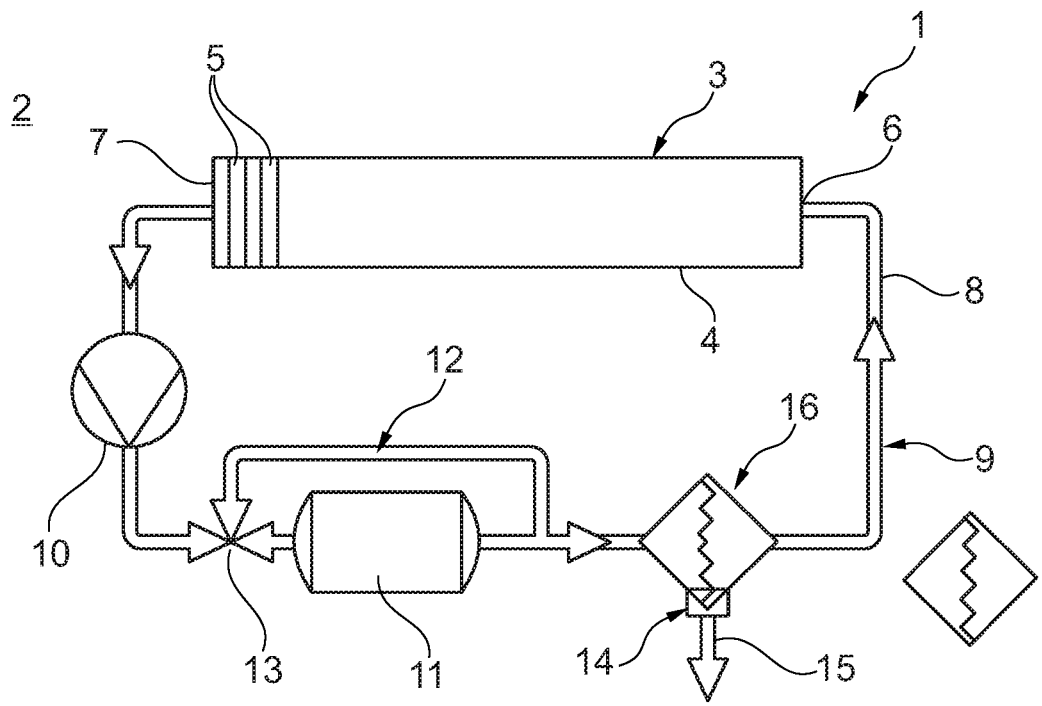
FIG. 1 an energy-storage arrangement according to the invention with a water-separator according to the invention in a filter device, FIG. 2 a representation as in FIG. 1, but with a water-separator taking the form of a dryer.
Figure 2:
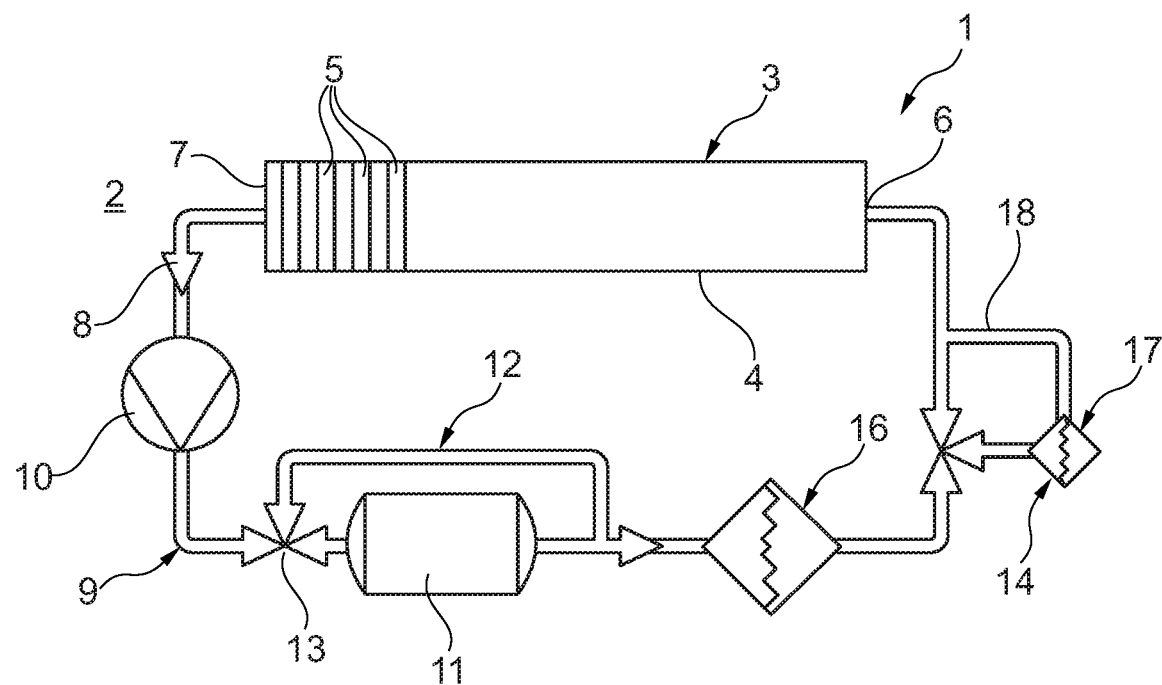

Corresponding to FIGS. 1 and 2, an energy-storage arrangement 1 according to the invention for, for instance, an electric or hybrid vehicle 2 exhibits an energy-storage device 3 with energy-storage cells 5 arranged in a housing 4. In the housing 4 merely a few energy-storage cells 5 have been sketched in, for the sake of clarity. The housing 4 possesses furthermore an inlet 6 and an outlet 7 for temperature-control fluid 8 which is flowing in a temperature-control-fluid circuit 9. The temperature-control-fluid circuit 9 is preferentially a constituent part of the energy-storage arrangement 1. Via the inlet 6 and the outlet 7, it is possible to subject the energy-storage cells 5 arranged in the housing 4 of the energy-storage device 3 directly to the action of temperature-control fluid 8, and thereby to control the temperature of, or to cool, said cells directly. Not only the housing 4 but additionally also a pump 10 as well as a heat-transfer means 11 are arranged in the temperature-control-fluid circuit 9. Via the pump 10 which, for instance, takes the form of an electric pump, a conveying of the temperature-control fluid 8 within the temperature-control-fluid circuit 9 takes place. Via the heat-transfer means 11, in particular a cooling of the temperature-control fluid 8 can take place.

Furthermore, a bypass 12 circumventing the heat-transfer means 11 may have been provided, by means of which the temperature-control fluid can be conducted around the heat-transfer means 11, in order, in particular, to be able to rule out an undesirable cooling of the energy-storage device 3. A splitting of the temperature-control fluid 8 between the heat-transfer means 11 and the bypass 12 is effected in this case via a valve device 13.

Now, in accordance with the invention a water-separator 14 for separating water 15 from the temperature-control fluid 8 is arranged in the temperature-control-fluid circuit 9.

If the energy-storage arrangement 1 according to the invention as represented in FIG. 1 is inspected, it can be discerned that in the temperature-control-fluid circuit 9 a filter device 16 is arranged which, for instance, exhibits a particle-filter or has been designed as such, it being possible for the water-separator 14 to be a constituent part of the filter device 16. In this case, the water 15 can be discharged or separated via the water-separator 14 of the filter device 16.

Additionally or alternatively, it is also conceivable that the water-separator 14 takes the form of a dryer 17, as represented in accordance with FIG. 2, the dryer 17 in this case being arranged in a partial-flow circuit 18 of the temperature-control-fluid circuit 9. In this case, a water-separator 14 in the region of the filter device 16 may be dispensed with. A dryer 17 of such a type may, for instance, exhibit a granular desiccant and may, for instance, have been designed in the manner of a cartridge-type dryer.

Irrespective of the chosen embodiment, the water-separator 14 according to the invention enables a separating or discharging of water contents from the temperature-control fluid 8, which, for instance, may take the form of cooling oil, and thereby reduces the electrical conductivity of the temperature-control fluid 8, as a result of which, in particular, the danger of a short circuit or of a fire can be reduced. Via the filter device 16, furthermore the wear of the pump 10, of the heat-transfer means 11 and also wear to the energy-storage cells 5 can be reduced.

The invention claimed is:

1. An energy-storage arrangement for an electric or hybrid vehicle, comprising:
   an energy-storage device including energy-storage cells arranged in a housing;
   the housing including an inlet and an outlet for a temperature-control fluid for direct temperature control of the energy-storage cells;
   a temperature-control-fluid circuit, in which the housing, a pump for conveying the temperature-control fluid, and a heat-transfer device are arranged; and
   a water-separator for separating or discharging water from the temperature-control fluid arranged in the temperature-control-fluid circuit upstream of the inlet between the housing and the heat-transfer device.

2. The energy-storage arrangement according to claim 1, wherein the temperature-control fluid is a cooling oil.

3. The energy-storage arrangement according to claim 1, further comprising a filter device arranged in the temperature-control-fluid circuit.

4. The energy-storage arrangement according to claim 3, wherein the filter device comprises a particle-filter.

5. The energy-storage arrangement according to claim 3, wherein the water-separator is a constituent part of the filter device.

6. The energy-storage arrangement according claim 1, wherein the water-separator comprises a dryer.

7. The energy-storage arrangement according to claim 6, wherein the dryer is arranged in a partial-flow circuit of the temperature-control-fluid circuit.

8. An electric or hybrid vehicle, comprising:
   an energy-storage arrangement including:
   a temperature-control-fluid circuit communicating a temperature-control fluid;
   an energy-storage device including a housing and a plurality of energy-storage cells arranged in the housing, the housing arranged in the temperature-control-fluid circuit and including an inlet and an outlet for direct temperature control of the plurality of energy-storage cells via the temperature-control fluid;
   a pump arranged in the temperature-control-fluid circuit for conveying the temperature-control fluid;
   a heat-transfer device arranged in the temperature-control-fluid circuit; and
   a water-separator arranged in the temperature-control-fluid circuit for separating or discharging water from the temperature-control fluid, wherein the water-separator is arranged upstream of the inlet between the housing and the heat-transfer device.

9. The electric or hybrid vehicle according to claim 8, wherein the heat-transfer device comprises a radiator.

10. The electric or hybrid vehicle according to claim 8, further comprising a filter device arranged in the temperature-control-fluid circuit between the heat-transfer device and the housing.

11. The electric or hybrid vehicle according to claim 10, wherein the water-separator is a constituent part of the filter device.

12. The electric or hybrid vehicle according to claim 8, wherein the water-separator comprises a dryer arranged in a partial-flow circuit of the temperature-control-fluid circuit, and wherein the partial-flow circuit is arranged between a filter device and the inlet of the housing.

13. The electric or hybrid vehicle according to claim 12, wherein the housing defines an interior and the plurality of energy-storage cells are arranged in the interior, and wherein the temperature-control fluid flows into the interior via the inlet for direct cooling of the plurality of energy-storage cells and out of the interior via the outlet.

14. The electric or hybrid vehicle according to claim 8, wherein the pump is arranged in the temperature-control-fluid circuit between the energy storage device and the heat-transfer device.

15. The electric or hybrid vehicle according to claim 8, wherein the temperature-control-fluid circuit includes a bypass extending around the heat-transfer device.

16. The energy-storage arrangement according to claim 1, wherein the heat-transfer device comprises a radiator.

17. The energy-storage arrangement according to claim 1, wherein the pump is arranged in the temperature-control-fluid circuit between the energy storage device and the heat-transfer device.

18. The energy-storage arrangement according to claim 1, wherein the temperature-control-fluid circuit includes a bypass extending around the heat-transfer device, and a valve device arranged between the pump and the heat-transfer device for dividing the temperature-control fluid between the bypass and the heat-transfer device.

19. An energy-storage arrangement for an electric or hybrid vehicle, comprising:
a temperature-control-fluid circuit communicating a temperature-control fluid;
an energy-storage device including a housing and a plurality of energy-storage cells arranged in an interior of the housing, the housing arranged in the temperature-control-fluid circuit and including an inlet and an outlet for direct temperature control of the plurality of energy-storage cells where the temperature-control fluid flows into the interior of the housing and directly around the plurality of energy-storage cells;
a pump arranged in the temperature-control-fluid circuit for conveying the temperature-control fluid;
a radiator arranged in the temperature-control-fluid circuit;
a water-separator arranged in the temperature-control-fluid circuit for separating or discharging water from the temperature-control fluid;
a filter device arranged in the temperature-control-fluid circuit between the radiator and the housing of the energy-storage device; and
wherein the pump is arranged between the energy-storage device and the radiator.

20. The energy-storage arrangement according to claim 19, wherein the water-separator is arranged upstream of the inlet between the housing and the radiator.

* * * * *